April 22, 1941.  J. H. HETZEL  2,239,458
VINE PULLING ATTACHMENT FOR POTATO DIGGERS
Filed Jan. 23, 1940  2 Sheets-Sheet 1
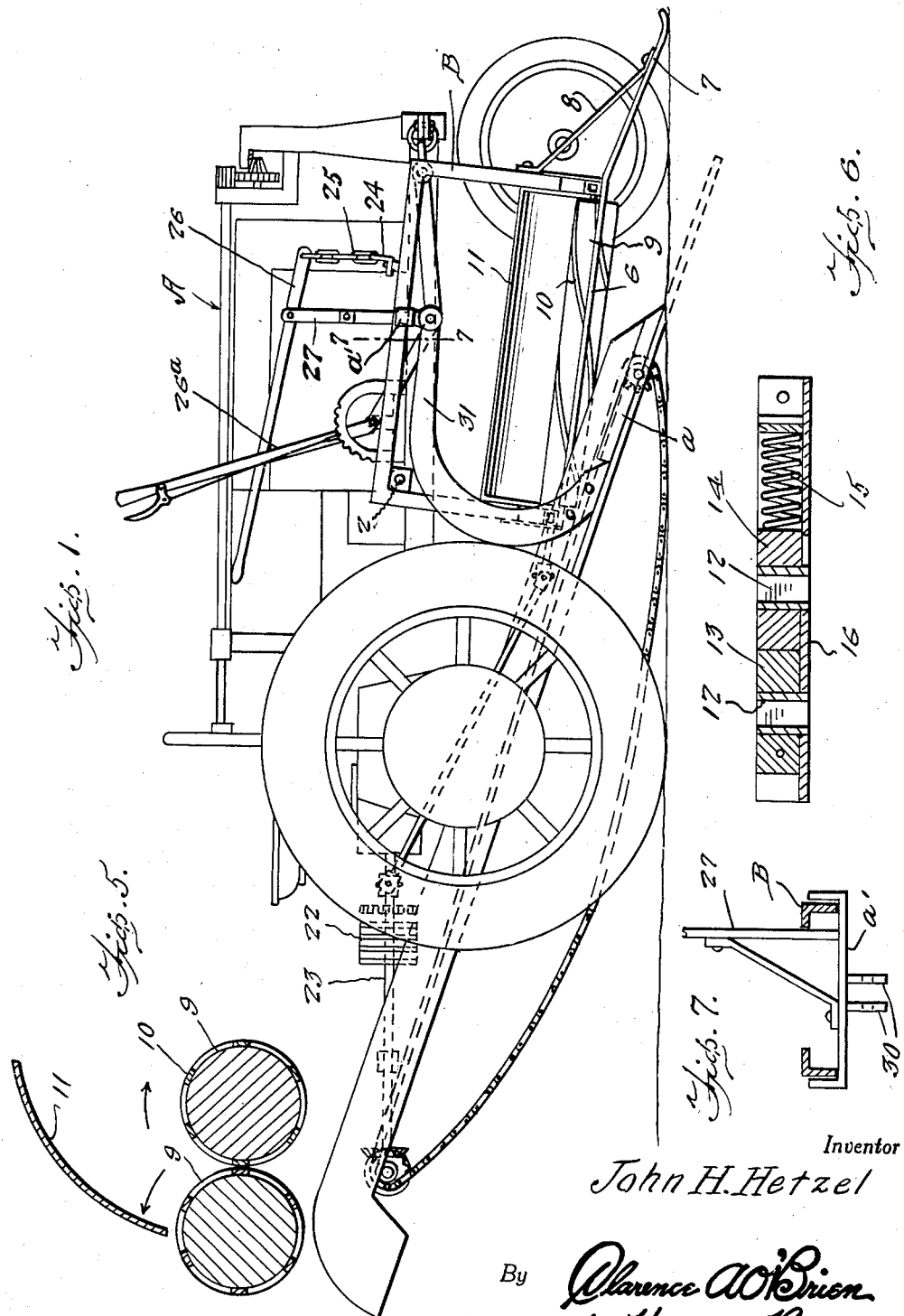
Inventor
*John H. Hetzel*
By *Clarence A. O'Brien
and Hyman Berman*
Attorneys

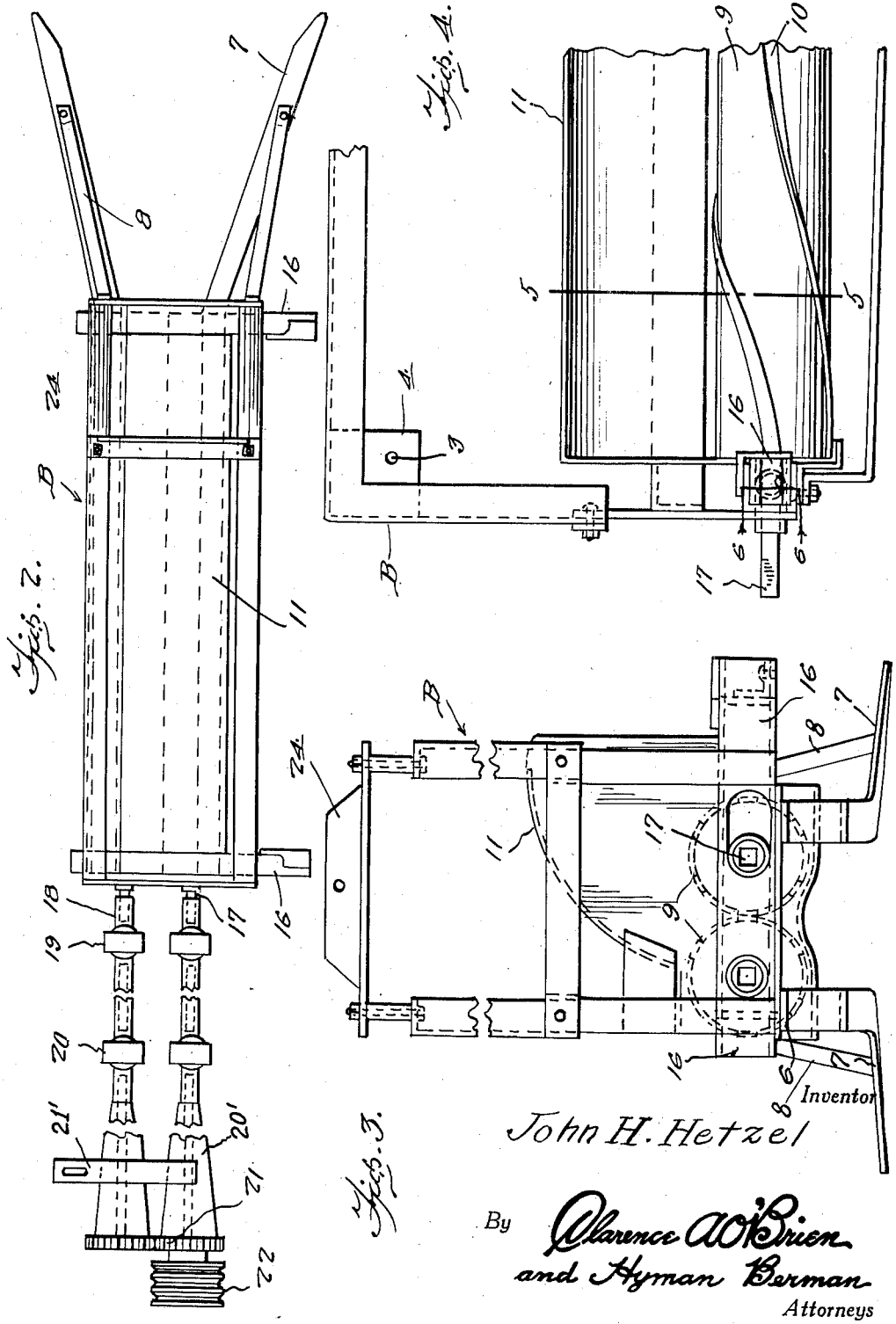

Patented Apr. 22, 1941

2,239,458

UNITED STATES PATENT OFFICE 2,239,458

VINE PULLING ATTACHMENT FOR POTATO DIGGERS

John H. Hetzel, Almond, Wis.

Application January 23, 1940, Serial No. 315,269

2 Claims. (Cl. 55—66)

This invention relates to a vine pulling attachment for potato diggers, the general object of the invention being to provide a frame pivotally supported over the front end of the digging part of the machine with runners for sliding on the ground and for guiding the plants between a pair of rollers which are rotated from the machine in a direction to lift the vines, with means for guiding the vines or plants to one side of the machine.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view of the potato digger supplied with the invention.

Figure 2 is a top plan view of the parts forming the invention or attachment.

Figure 3 is a view of one end thereof.

Figure 4 is a fragmentary side view of the rear part of the attachment.

Figure 5 is a section on the line 5—5 of Figure 4.

Figure 6 is a section on the line 6—6 of Figure 4.

Figure 7 is a section on the line 7—7 of Figure 1.

In Figure 1 the digging machine is shown generally at A and includes the lifting or digging part a and in carrying out my invention I provide an upright substantially rectangular frame B of skeleton construction which is pivotally connected with the digger frame at the upper rear corner of the frame of the attachment as shown at 2, the pivot member passing through holes 3 formed in corner pieces 4 of the frame. Flat bars 6 extend from the lower ends of the rear parts of the frame B to the lower ends of the front portions thereof and from said front portions the bars extend downwardly and outwardly in diverging relation to form the runners 7 which are braced as at 8 and have their ends curved upwardly as shown in Figure 1 to slide upon the ground and in advance of the front end of the digging assembly a of the machine. A pair of longitudinally extending rollers 9 is journaled on the lower part of the frame and each roller has a spiral rib 10 thereon and these rollers slope downwardly and forwardly and receive between them the vines or plants which are directed toward their front ends by the members 7. These rollers are turned in opposite directions as shown by the arrows in Figure 5 so that they will lift the vines or plants gripped between them and a shield 11 of arcuate shape in cross section is placed above the rollers and supported in the frame B and tends to throw the vines or to move the vines to one side of the machine so that the vines will not travel up the digging assembly with the potatoes. The pintles of the rollers are supported in the bearing members 12, the bearing member for each end of one of the rollers being carried by the stationary block 13 while the bearing member for each end of the other roller is carried by a sliding block 14 which is pressed toward the block 13 by a spring 15 as shown in Figure 6. Thus the two rollers are yieldingly held together. The blocks are carried by the end pieces 16 at the lower ends of the frame B. The rear end of each pintle is of square shape in cross section and extended as shown at 17 for telescoping into a tubular part 18 of a universal joint 19 and other joints 20 are provided which have parts telescoping with other parts of the shafting as shown in Figure 2 so as to make a flexible shafting for driving each roller. The shafting of the two rollers are geared together by the gears 21, see Figure 2, and one gear is connected to a multiple pulley 22 which is driven by belting or the like from a shaft 23 of the machine. The parts of the shafting which have the gears 21 attached thereto have their bearing members 20' rigidly supported by a bracket 21' attached to a part of the digging machine so that the gears 21 are held in mesh at all times even when the rollers 9 are moved apart, the telescopic and universally connected shafting permitting this. A cross piece 24 is connected to the top of the frame B and a chain 25 connects this cross piece with the front end of a hand lever 26 pivoted to an upright 27 attached to a part of the machine so that by manipulating this lever 26 the frame B can be swung on its pivot 2 to raise the runners 7 off the ground, said runners resting on the ground under the action of gravity when the lever 26 is released.

From the foregoing it will be seen that I have provided simple means for raising vines or plants before the roots of the plants are lifted by the digging machine, or just as the roots are being lifted and then the plants or vines are directed toward one side of the machine where they are thrown upon the ground, the potatoes or roots being carried up by the conveyor of the digging machine in the usual manner. By turning the rollers in the direction shown by the arrows in Figure 5 any roots adhering to the plants or vines will be separated from the plants or vines by such rollers.

A cross bar a' forms part of the machine A and forms a rest for the upright 27 and said cross bar acts as a stop for limiting downward movement of the frame B as shown in Figure 7. This cross member carries the ears 30 to which the front end of the beam 31 of the machine is pivoted as shown in Figure 1. A lever 26a is suitably connected with the beam 31 to raise and lower the digging assembly and as will be seen as this assembly is raised and lowered the frame B is also raised and lowered.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A vine lifting attachment for a digging machine comprising a frame, means for pivotally connecting the rear part of the frame to the frame of the machine, the attachment frame sloping downwardly and forwardly, forwardly diverging runners connected to the front end of the attachment frame and having their front ends engaging the ground, a pair of rollers journaled in the lower part of the attachment frame and extending longitudinally and sloping downwardly and forwardly and having spiral ribs thereon, the runners directing the vines to the rollers, means for yieldingly pressing one roller toward the other roller, shafting rotatably supported in the machine frame and including universal joints and telescopic parts, said shafting being connected to the rear ends of the rollers to rotate the same, gears on the rear parts of the shafting for the two rollers, said gears meshing with each other, bearing means for the rear parts of the shafting rigidly connected with the machine frame and acting to hold the gears in mesh and means for rotating one of the gear carrying parts from a movable part of the digging machine.

2. A vine lifting attachment for a potato digging machine, which machine includes a digging part having a beam connected with its front part and means for tilting the beam to raise and lower the digging part, said attachment including a substantially rectangular frame, means for pivotally connecting the upper rear corner of said frame to the machine above the digging part with the front of the frame extending forwardly beyond the digging part and said frame sloping downwardly and forwardly, downwardly and forwardly sloping rollers journaled in the lower part of the frame, runners connected with the front end of the frame and diverging forwardly for directing vines to the rollers, a shield for directing the vines lifted by the rollers to one side of the frame, a cross bar pivotally connected to an intermediate part of said beam, said cross bar extending under the top of the frame for limiting downward movement of the frame, a post carried by the cross bar, a lever pivoted to the post and a flexible member connecting the lever to the top of the frame, said lever forming means for adjusting the frame on its pivot to move the runners toward and away from the ground.

JOHN H. HETZEL.